(12) United States Patent
Wu

(10) Patent No.: US 7,699,661 B2
(45) Date of Patent: Apr. 20, 2010

(54) ELECTRICAL CARD CONNECTOR HAVING METALLIC HINGE FOR RELIABLY SUPPORTING A PIVOTALLY MOUNTED COVER THEREON

(75) Inventor: Chun-Kung Wu, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/074,795

(22) Filed: Mar. 5, 2008

(65) Prior Publication Data

US 2008/0220661 A1  Sep. 11, 2008

(51) Int. Cl.
    *H01R 24/00* (2006.01)
(52) U.S. Cl. ...................................... 439/630
(58) Field of Classification Search .................. 439/630, 439/138, 725
    See application file for complete search history.

(56) References Cited

U.S. PATENT DOCUMENTS

| 5,273,459 | A  | * | 12/1993 | Davis ........................... 439/607 |
| 5,996,891 | A  | * | 12/1999 | Braun ........................... 235/441 |
| 6,099,337 | A  | * | 8/2000  | Chan ............................ 439/326 |
| 6,210,193 | B1 | * | 4/2001  | Ito et al. ...................... 439/326 |
| 6,234,810 | B1 | * | 5/2001  | Schnell et al. ................ 439/76.1 |
| 6,786,748 | B2 | * | 9/2004  | Masson et al. ................ 439/188 |
| 6,881,086 | B2 | * | 4/2005  | Ohashi ......................... 439/326 |
| 6,913,479 | B1 | * | 7/2005  | Su et al. ....................... 439/326 |
| 7,080,995 | B2 | * | 7/2006  | Cheng .......................... 439/138 |
| 7,118,419 | B1 | * | 10/2006 | Lee ............................... 439/630 |
| 7,125,275 | B1 | * | 10/2006 | Ju et al. ........................ 439/342 |
| 7,160,129 | B2 | * | 1/2007  | Yin .............................. 439/331 |
| D571,300  | S  | * | 6/2008  | Wu ............................. D13/147 |
| 2003/0109178 | A1 | * | 6/2003 | Ohashi ......................... 439/630 |
| 2005/0014402 | A1 | * | 1/2005 | Ma et al. ...................... 439/135 |
| 2005/0026490 | A1 | * | 2/2005 | Ma ............................... 439/331 |
| 2005/0059288 | A1 | * | 3/2005 | Lin et al. ...................... 439/342 |
| 2007/0093137 | A1 | * | 4/2007 | Zhao et al. ................... 439/630 |

* cited by examiner

*Primary Examiner*—T C Patel
*Assistant Examiner*—Harshad C Patel
(74) *Attorney, Agent, or Firm*—Ming Chieh Chang; Wei Te Chung; Andrew C. Cheng

(57) ABSTRACT

An electrical card connector for receiving a card comprises an insulating housing with a plurality of contacts, a cover, and a pivoting mechanism moveably connecting the cover and the housing. A pair pivoting portions is disposed on the opposite sides of a rear end of the cover, and a pair of mounting portions is disposed on an end of the housing corresponding to the pivoting portions. The connector further comprises an enforcing member having a pair of pivoting wings mounted to the mounting portions of the housing, and each pivoting wing has a pivoting hole for moveably connecting the pivoting portion of the cover. The pivoting wing of the enforcing member and the pivoting portion of the cover together form the pivoting mechanism.

14 Claims, 4 Drawing Sheets

ELECTRICAL CARD CONNECTOR HAVING METALLIC HINGE FOR RELIABLY SUPPORTING A PIVOTALLY MOUNTED COVER THEREON

BACKGROUND OF THE INVENTION

1. Field of the Invention

The present invention relates to a card connector, and more particularly to a card connector with a metallic hinge socket supporting a pivotally mounted cover so as to provide a reliable support thereof.

2. Description of Related Art

IC (integrated circuit) cards are known in the art and contain artificial intelligence in the form of a memory circuit or other electronic program. A card reader is used to read the information or retrieve the memory stored on the card. IC cards are used in countless applications today, including video cameras, smart-phones, music players, ATMs, cable television decoders, toys, games, pc adapters and other electronic applications.

An electrical card connector, be mounted onto a printed circuit board, comprises a metal shield, an insulating housing, and a plurality of contacts received in the housing. The shield comprises a horizontal base and a pair of sidewalls extending from the opposite laterals of the base vertically and downwardly. A pair of pivoting portions respectively extends from the same end of the sidewalls, and a pair of pivoting grooves is defined at one end of the housing respectively engaging with the corresponding pivoting portion moveably. The shield could rotate between a first opening position and a second closing position, and then slide into a third locking position. At least a stopping tab is defined on the shield, and a locking portion is defined on the housing corresponding to the stopping tab. When the shield is driven to the third locking position, the locking portion engages with the stopping tab in a manner such that the shield could not move relative to the housing.

One problem of this type connector is that during using the card connector, once the shielding is rotated relative to the housing, the pivoting portion of the shielding will rub (or scrab) the pivoting groove of the housing to cause the insulating frame of the pivoting groove, especially the top frame of the pivoting groove getting weaker because the plastic material was lost resulted from friction, even destroy the pivoting groove eventually. Once this is happened, the reliability of the connector is negatively effected.

Hence, an improved card connector is highly desired to overcome the aforementioned disadvantages of the prior art.

SUMMARY OF THE INVENTION

Accordingly, an object of the present invention is to provide a card connector which is provided with a metallic hinge so as to overcome unwanted material loss resulted from friction between metal and plastic housing.

To achieve the above object, an electrical card connector for receiving a card comprises an insulating housing with a plurality of contacts, a cover, and a pivoting mechanism moveably connecting the cover and the housing. A pair of pivoting portions is disposed on the opposite side of a rear end of the cover, and a pair of mounting portions is disposed on an end of the housing corresponding to the pivoting portions. The connector further comprises an enforcing member having a pair of pivoting wings mounted to the mounting portions of the housing, and each pivoting wing has a pivoting hole for moveably connecting the pivoting portion of the cover. The pivoting wings of the enforcing member and the pivoting portions of the cover together form the pivoting mechanism.

Other objects, advantages and novel features of the present invention will be drawn from the following detailed description of a preferred embodiment of the present invention with attached drawings.

DETAILED DESCRIPTION OF THE INVENTION

Reference will now be made in detail to the preferred embodiment of the present invention.

Figure 1:
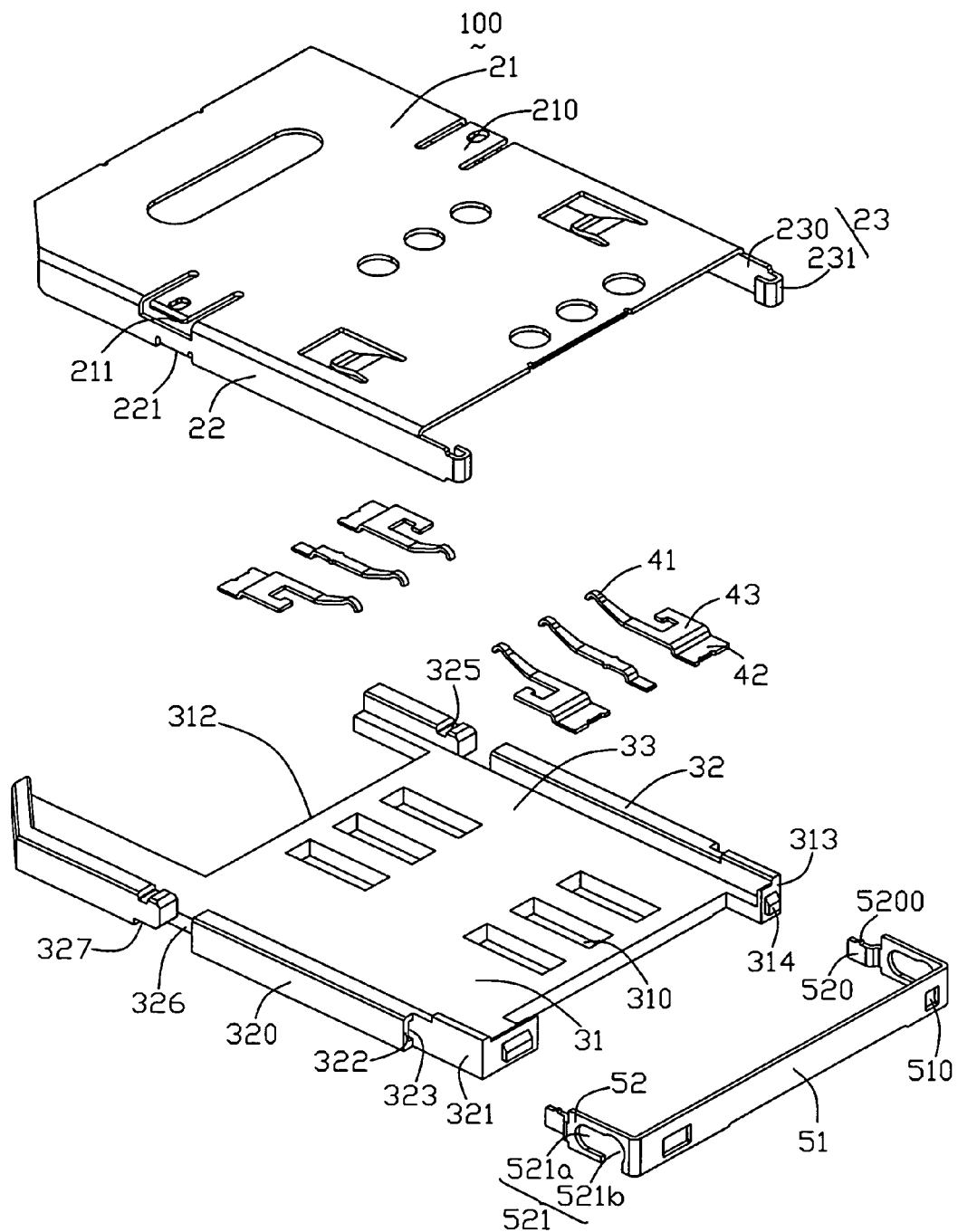
FIG. 1 is an exploded, perspective view of a card connector in accordance with the present invention.
Figure 2:
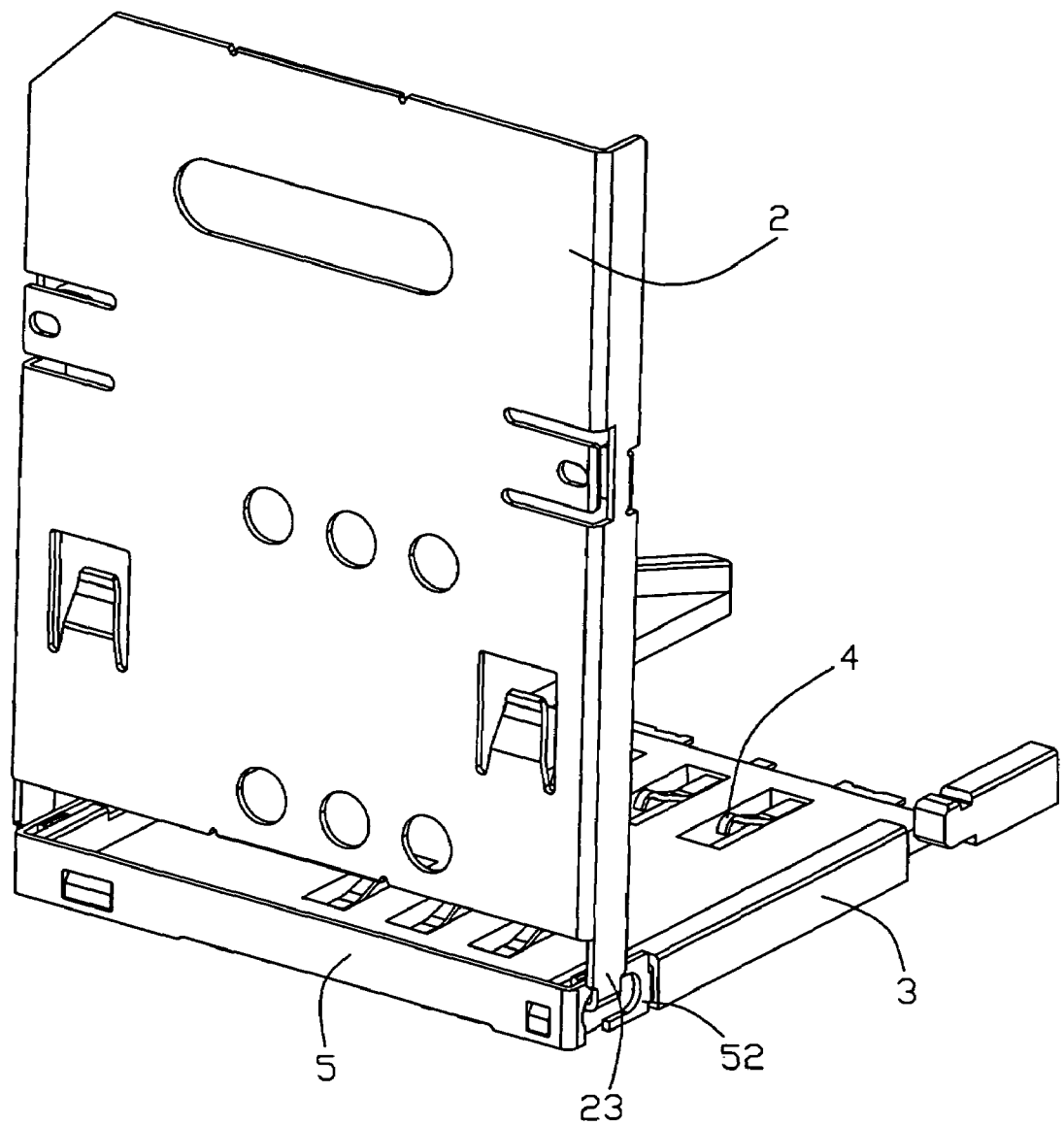
FIG. 2 is a assembled, perspective view of the card connector of FIG. 1 when the shielding is at the first opening position.

Referring to FIGS. 1-2, the card connector 100 made in accordance with the present invention is adapted for electrically connecting a card (not labeled) to a printed circuit board (not shown), and comprises an insulating housing 3, a plurality of contacts 4 received in the housing, a metal cover 2, an enforcing member 5, and a pivoting mechanism (not labeled) connecting the housing and the cover moveably.

The metal cover comprises a top surface 21, a pair of lateral surfaces 22 respectively extending from the opposite ends of the top surface 21 vertically and downwardly, and a pair of pivoting portions 23 respectively extending from the same end of the lateral surfaces 22 backwardly and horizontally. The pivoting portion 23 includes a connecting portion 230 extending from the lateral surface 22 and a hook 231 bent from the rear end of the connecting portion 230 inwardly to form a U-shaped structure. A pair of flexible sheets or deflectable tangs 210 is respectively defined on the opposite fringe of the top surface 21, and a dimple 211 is defined on the center of the flexible sheet 210 downwardly. At least a stopping tab 221 extends from the bottom of the lateral surface 22 inwardly and horizontally and substantially runs in parallel to the top surface 21. The dimple 211 and the stopping tab 221 together form the stopping portion of the cover 2.

The housing 3 is generally configured in a frame configuration. The housing 3 comprises a base 31 and a pair of sidewalls 32 extending upward from the opposite side of the base 31 to form a receiving space 33 together with the base 31 for receiving the card and an opening (not labeled) adjacent to the front end 312 of the base 31 for receiving the inserted card. The base 31 is provided with two rows of elongate through holes passageway 310 for receiving the corresponding contacts. A pair of mounting portions 321 is formed on the same end of the opposite sidewalls 32, and the mounting portion 321 is lower relative to the exterior surface 320 of the sidewall 32 along the left-to-right direction. A joined surface 322 connects the mounting portion 321 and the sidewall 32, and a mounting groove 323 is formed on the center of the joined surface 322 inwardly. Two protrusions 314 are protruded on the rear surface 313. A recess 325 is formed on the top of the sidewall 32 for locking the dimple 211 of the cover 2, a cutout 326 is formed on the sidewall 32 of the housing from the exterior surface 320 inwardly, and a stopping portion 327 with a downward recess (not labeled) thereunder is formed on the bottom of the sidewall 32 for stopping the stopping tap of the cover 2.

The contact 4 comprises a contacting portion 41 extending slantways and upwardly for contacting a corresponding contacting pad (not shown) of the card, a soldering portion 42 extending backwardly for soldering onto the printed circuit board, and a connecting portion 43 connecting the contacting portion 41 and the soldering portion 42. Each contact 4 is mounted in the corresponding passageway 310, wherein the contacting portion 41 extending along the passageway 310 and protruding into the receiving space 33, and the soldering portions 43 protruding out of the front and the rear end of the housing 3.

The enforcing member 5 is made of an elongate metal plane, and comprises an elongate body 51 mounted on the rear surface 313 of the housing 3 and a pair of pivoting wings 52 extending from the opposite end of the body 51 vertically and mounted on the mounting portion 321 of the housing 3. The body 51 defines two openings 510 for engaging with the protrusions 314 to limit the displacement of the enforcing member 5 in vertical direction. A fastening portion 520 extends from the free end of the pivoting wing 52 inserted into the mounting groove 323, and at least a pair of tabs 5200 extends from the two opposite sides of fastening portion 520 abutting with the inner surface of the mounting groove 323 to limit the displacement of the enforcing member 5 in horizontal direction. The pivoting wing 52 defines a pivoting hole 521 having a first pivoting section 521a and a second pivoting section 521b with an opening (not label) running through the pivoting hole 521 to the bottom of the enforcing member 5. The hook 231 is mounted in the pivoting hole 521 along the opening.

The pivoting portions 23 defined on the cover 2 and the pivoting wings 52 mounted on the mounting portion 321 of the housing 3 together to form the pivoting mechanism.

The card connector 100 is fixed onto the printed circuit board by soldering the soldering portions 42 of the contacts 4 to the corresponding soldering pads (not label) of the printed circuit board.

Figure 3:
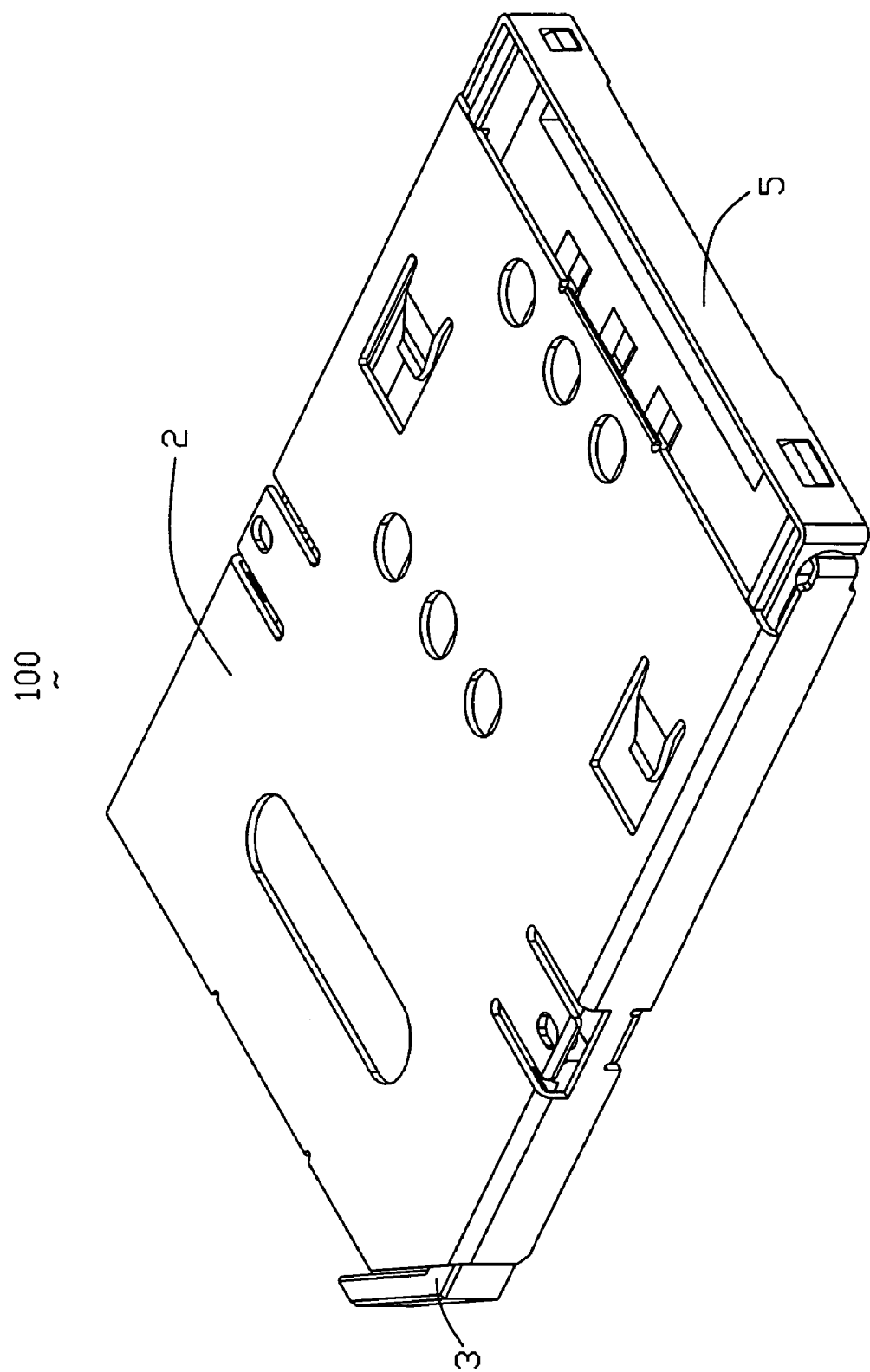
FIG. 3 is another assembled, perspective view of the card connector of FIG. 1 when the shielding is at the second closing position.
Figure 4:
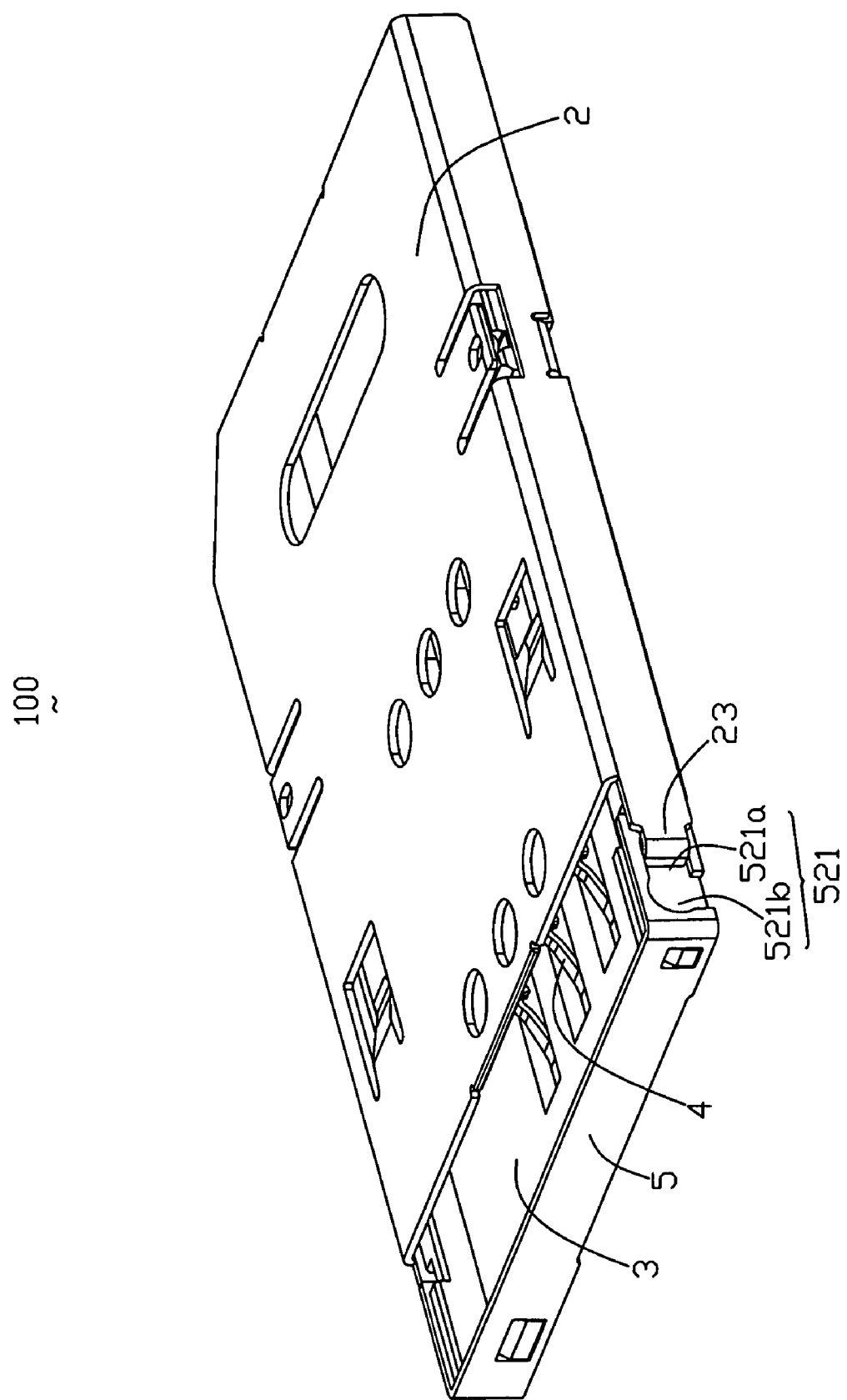
FIG. 4 is another assembled, perspective view of the card connector of FIG. 1 when the shielding is at the third locking position.

The steps of inserting a card into the connector 100 are: firstly, the cover 2 is kept at a first opening position relative to the housing 3 at an angle, and then inserting the card into the receiving space 33; secondly, turn the cover 2 around so as to set the hook 231 to a second closing position making an angle of zero degree with respect to the housing 3, referring to FIG. 3, the stopping tab 221 is in the cutout 326; finally, push the cover 2 along the back-to-front direction to a third locking position (referring to FIG. 4) as the hook 231 slides from the second pivoting section 521b to the first pivoting section 521a, and the stopping tab 221 of the cover 2 engages with the locking portion of the housing when the dimple 211 is stopped by the recess 325 and the stopping tab 221 engaging with the stopping portion 327.

The present card connector 100 takes advantage of the enforcing member 5 mounted on the housing 2 defining pivoting holes 521 at the two pivoting wings 52 to form the pivoting mechanism together with the pivoting portions 23, and compares to the related art enforcing the strengthen of the whole connector 100, and further the pivoting wings 52 of the enforcing member 5 could sustaining larger external force.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electrical card connector, comprising:
an insulative housing defining a front portion and a rear portion with a mating interface extending therebetween, a plurality of contact received in the housing and having contact engaging portion extending above the mating interface, the housing further including sidewalls extending along edges of the housing;
a metallic hinge attached to the rear portion of the housing, and the hinge comprising a pair of spaced apart sockets, each socket being adjacent to the respective sidewall of the housing; and
a metallic cover pivotally attached to the insulative housing, and including a pair of joints rotationally received in the corresponding sockets of the hinge.

2. The electrical card connector as described in claim 1, wherein each hinge has a fastening portion inserted into a mounting groove defined on the side wall along a mating direction, and the fastening portion and the socket form a step configuration so as to allow each joint be sandwiched between the corresponding socket and the side wall.

3. The electrical card connector as described in claim 2, wherein each socket of the hinge defines an opening facing downwardly to guide the corresponding joint sliding therein, and said joint is smoothly rotated along an inner edge of the socket.

4. The electrical card connector as described in claim 1, wherein the cover comprises a top surface and a pair of lateral surfaces respectively extending downward from opposite edges thereof, each of said joints extends backward from corresponding lateral surface and formed a hook portion at a distal end to insert into the socket of the hinge through an opening defined at a bottom of the hinge.

5. An electrical connector comprising:
an insulative housing;
a plurality of terminals disposed on the insulative housing with contact sections extending above an upper face of the housing;
a cover pivotally mounted on the insulative housing and configured to be allowed to move a distance along a front-to-back direction to a final horizontal position when said cover is positioned in an initial horizontal position intimately contacting the insulative housing in a vertical direction;
at least one upward cutout formed in a lateral side arm of the insulative housing;
at least one downward recess formed in said lateral side arm and horizontally communicating with and adjacent to the cutout;
at least one upward recess formed in said lateral side arm; and
an rigid stopping tab and a deflectable tang formed on a side edge region of the cover under a condition that the deflectable tang is essentially right above the stopping tab; wherein
both said deflectable tang and said stopping tab are moved toward the upward cutout when the cover is rotated from an upper position to said initial horizontal position, and further to the upward recess and the downward recess, respectively, when said cover is moved to the final horizontal position along said front-to-back direction.

6. The electrical connector as claimed in claim 5, wherein said upward recess is located adjacent to the cutout while segregated from said cutout under condition that the upward recess is essentially right above the downward recess.

7. The electrical connector as claimed in the claim 6, wherein said at least side arm defines a chamfered structured at a rear end, and said housing further includes another side arm which is shorter than said side arm in the front-to-back direction.

8. The electrical connector as claimed in claim 6, further including a one piece metallic hinge having an elongated body extending in a transverse direction, which is perpendicular to said front-to-rear direction, with essentially a full dimension of said housing, and a pair of wings extending from two ends of the body in said front-to-rear direction.

9. The electrical connector as claimed in claim 8, wherein said housing further includes another side arm, and the two wings are respectively located by two outer sides of said side arm and said another side arm.

10. An electrical card connector comprising:
   an insulative housing defining a front end and a rear end connected by a pair of side walls thereby defining a mating interface therebetween and extending along a rear-to-front direction;
   a plurality of terminals mounted on the insulative housing with contacting sections extending above the mating interface;
   a metallic hinge having an elongated body abutting against the rear end of the insulative housing along a transverse direction perpendicular to the rear-to-front direction, and a pair of wings perpendicularly extending from opposite edges of the body along said rear-to-front direction and each defining a socket thereon; and
   a cover attached to the metallic hinge with a pair of pivoting portions respectively received in said sockets.

11. The electrical card connector as described in claim 10, wherein the pivoting portion is perpendicular to and spaced to the body of the metallic hinge when the cover is in a parallel relationship with the insulative housing after the cover assembled onto the metallic hinge.

12. The electrical card connector as described in claim 10, wherein the cover forms a pair of lateral side surfaces extending along the rear-to-front direction and each pivoting portion is respectively formed at a distal end of the corresponding side surface, the lateral side surfaces together with the metallic hinge surround a periphery of the insulative housing to strength the intensity of the insulative housing.

13. The electrical card connector as described in claim 12, wherein the socket of each wing defines an opening opened downwardly to allow the pivoting portion to insert into.

14. The electrical card connector as described in claim 10, wherein the terminals are arranged in two rows and the contacting sections extend toward each other.

* * * * *